United States Patent [19]
Able et al.

[11] Patent Number: 6,145,430
[45] Date of Patent: Nov. 14, 2000

[54] SELECTIVELY BONDED PUMP DIAPHRAGM

[75] Inventors: Stephen D. Able; Nicholas Kozumplik, Jr., both of Bryan, Ohio

[73] Assignee: Ingersoll-Rand Company, Woodcliff Lake, N.J.

[21] Appl. No.: 09/107,633

[22] Filed: Jun. 30, 1998

[51] Int. Cl.[7] .................................................. F16J 3/02
[52] U.S. Cl. .................................... 92/93; 92/96; 92/100
[58] Field of Search .................................. 417/63, 413.1; 92/93, 96, 100

[56] References Cited

U.S. PATENT DOCUMENTS

| | | | |
|---|---|---|---|
| 2,918,089 | 12/1959 | McFarland, Jr. | 137/793 |
| 2,989,065 | 6/1961 | McDuffie | 137/100 |
| 3,376,898 | 4/1968 | Hugley | 138/137 |
| 3,802,267 | 4/1974 | Lofink | 73/279 |
| 4,231,287 | 11/1980 | Smiley | 92/94 |
| 4,238,992 | 12/1980 | Tuck, Jr. | 92/103.5 D |
| 4,569,634 | 2/1986 | Mantell | 417/63 |
| 4,741,252 | 5/1988 | Harter et al. | 92/103 |
| 4,768,547 | 9/1988 | Danby et al. | 137/454.4 |
| 4,905,575 | 3/1990 | Knecht et al. | 92/103 SD |
| 4,915,018 | 4/1990 | Scott et al. | 92/98 D |
| 5,188,515 | 2/1993 | Horn | 417/63 |
| 5,349,896 | 9/1994 | Delaney, III et al. | 92/98 R |
| 5,435,230 | 7/1995 | Phillips | 92/91 |
| 5,437,219 | 8/1995 | Scott et al. | 92/96 |
| 5,560,279 | 10/1996 | Connors et al. | 92/5 R |
| 5,724,881 | 3/1998 | Reynolds | 92/100 |

FOREIGN PATENT DOCUMENTS

WO 94/29593  12/1994  WIPO.

OTHER PUBLICATIONS

Warren Rupp, Inc. UniRupp One–Piece Teflon® Diaphragm Brochure, copyright 1998.

"Safe and Reliable Process Diaphragm Pumps"; G.Vetter, E.Schlücker, J.Jarosch, W.Horn; *World Pumps*, Jun. 1993, pp. 30–40.

*Primary Examiner*—Edward K. Look
*Assistant Examiner*—Thomas E Lazo
*Attorney, Agent, or Firm*—Leon Nigohosian, Jr.

[57] ABSTRACT

A selectively bonded two-ply diaphragm for a diaphragm pump having adjacent first and second layers of the diaphragm which are selectively bonded at the interface between the layers in at least one attachment portion, which is adapted for attachment to a pump. A working portion is provided in which the first and second layers are free to move relative to one another at the interface. The attachment portion may include a central portion which is adapted for attachment to a diaphragm rod of a pump and a peripheral portion surrounding the central portion which is adapted for stationary attachment to a pump housing. The working portion joins the peripheral portion and the central portion. Selective bonding of the diaphragm is by at least partially bonding or substantially bonding the first and second layers at the interface in the peripheral portion, the central portion, or both.

14 Claims, 6 Drawing Sheets

SELECTIVELY BONDED PUMP DIAPHRAGM

FIELD OF THE INVENTION

This invention generally relates to a pump diaphragm for a diaphragm pump, and more particularly to an improved pump diaphragm for an air operated diaphragm pump where the diaphragm includes means for reducing pump diaphragm failure due to fatigue.

DESCRIPTION OF THE PRIOR ART

Diaphragm pumps are widely used in pumping a wide variety of materials including materials which are abrasive, have high viscosity, or consist of slurries that might damage other pump designs. Diaphragm pumps are often air driven which is advantageous in pumping flammable liquids or in environments where electrically driven equipment could otherwise be hazardous. Electrically or otherwise mechanically driven diaphragm pump designs, however, are also utilized.

The pump diaphragm is the critical driving member of the diaphragm pump and is a relatively flexible membrane that has an outer peripheral portion that is clamped or otherwise held in a stationary position against the pump housing. Such diaphragms also include a centrally located portion and a working portion that joins the central and peripheral portions. The central portion is clamped between a pair of clamping washers or the like during operation of the pump. The working and central portions of the diaphragm are displaced in a reciprocating manner along an axis to drive liquid out of the pump.

A diaphragm rod or other rigid connection member is connected at one end to the washers along the diaphragm central portion, and extends through the diaphragm, and is operatively connected to a mechanical means for cycling the diaphragm in a reciprocating manner. The useful life of a diaphragm typically can range from 10–20 million cycles. In many instances the solid or fluid material being pumped is of a corrosive nature which often causes a diaphragm to fail rapidly. Failure of the diaphragm may result in corrosive material contaminating the pump equipment. A diaphragm failure may also cause the release of chemicals to an air stream that subsequently gets released into the environment where it may result in further damage or injury.

Attempts have been made to extend the lives of such diaphragms from the corrosive effects of acids or other chemicals to protect against such failure. Often, chemically resistant synthetic resin polymer materials including polymer materials such as polytetrafluoroethylene (PTFE) are used as an overlay to a rubber backer diaphragm so that the rubber is protected from the corrosive chemicals. For this purpose, a two-piece diaphragm has been employed which incorporates an outer overlay diaphragm made of a synthetic resin polymer such as PTFE to protect a separate inner backer diaphragm, typically made from a reinforced rubber or thermoplastic elastomer, from corrosive materials. This two-piece design has the attendant drawback, however, that it requires the use of two separate diaphragms which must be installed by a user.

In an effort to facilitate the handling and installation of such two-piece diaphragms, a bonded two-ply diaphragm has been provided in which a protective outer overlay diaphragm of PTFE was chemically bonded to the rubber backer diaphragm. Although initially more popular among users due to their ease of handling and installation, these two-ply bonded diaphragms suffer from an overall decrease in life when compared with the use of two-piece unbonded diaphragms. Attempts have been made improve the life of bonded two-ply diaphragms by varying geometry to and materials selections to minimize stress on the diaphragm caused during operation of the pump. Such modifications to the bonded design, however, still appear to provide lower service lives than those provided by two-piece unbonded diaphragms.

The foregoing illustrates limitations known to exist in present devices and methods. Thus, it is apparent that it would be advantageous to provide an improved two-ply bonded diaphragm that has a longer useful life. Accordingly, a suitable alternative is provided including features more fully disclosed hereinafter.

SUMMARY OF THE INVENTION

According to the present invention, a two-ply diaphragm is provided having a backer layer which is selectively bonded to a protective layer such that the resultant bonded two-ply diaphragm appears to be a single diaphragm to a user while having the ability to move in the working area of the diaphragm during operation. This is achieved by selectively bonding adjacent first and second layers of the diaphragm at the interface between the layers in at least one attachment portion, which is adapted for attachment to a pump. A working portion is provided in which the first and second layers are free to move relative to one another at the interface.

In one aspect of the invention, the attachment portion includes a central portion which is adapted for attachment to a diaphragm rod of a pump and a peripheral portion surrounding the central portion which is adapted for stationary attachment to a pump housing. The working portion joins the peripheral portion and the central portion.

In various embodiments, the selectively bonded diaphragm is achieved by at least partially bonding the first and second layers at the interface in the peripheral portion, the central portion, or both.

In alternative embodiments, the selectively bonded diaphragm is achieved by substantially bonding the first and second layers at the interface in the peripheral portion, the central portion, or both.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION OF THE PREFERRED EMBODIMENTS

Figure 1:
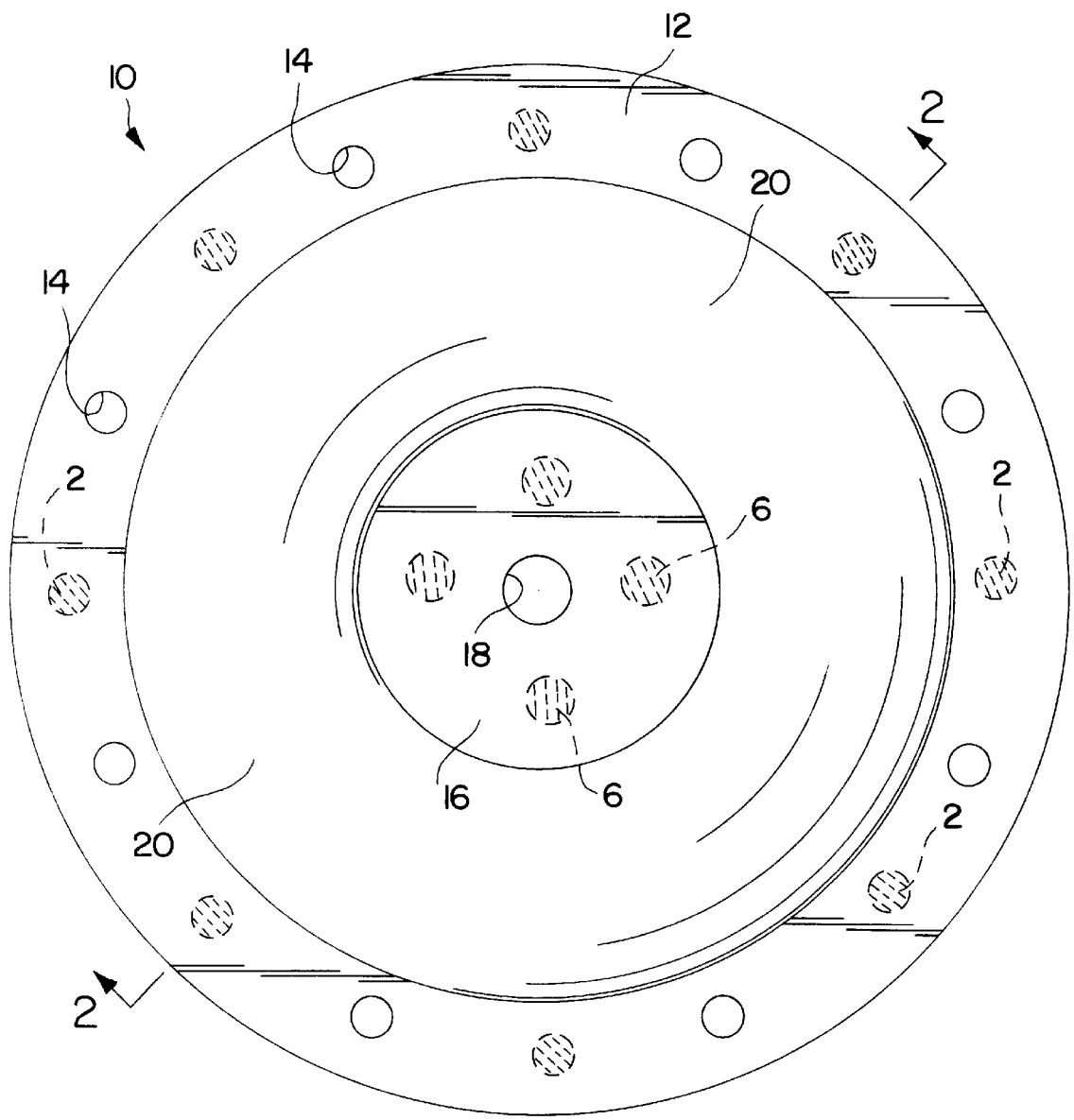
FIG. 1 is a planar view of a first embodiment of a pump diaphragm according to the present invention.

As used herein, the term "diaphragm" means a flexible barrier that divides two fluid containing chambers or compartments. Typically, such barriers are useful with diaphragm pumps, however, these diaphragms may also be employed as a barrier layer between two compartments in any application where a fluid exists in one compartment and would cause deleterious effects if present in the other compartment.

The invention is best understood by reference to the accompanying drawings in which like reference numbers refer to like parts. It is emphasized that, according to common practice, the various dimensions of the diaphragms and the associated pump parts as shown in the drawings are not to scale and have been enlarged or reduced for clarity.

Figure 2:
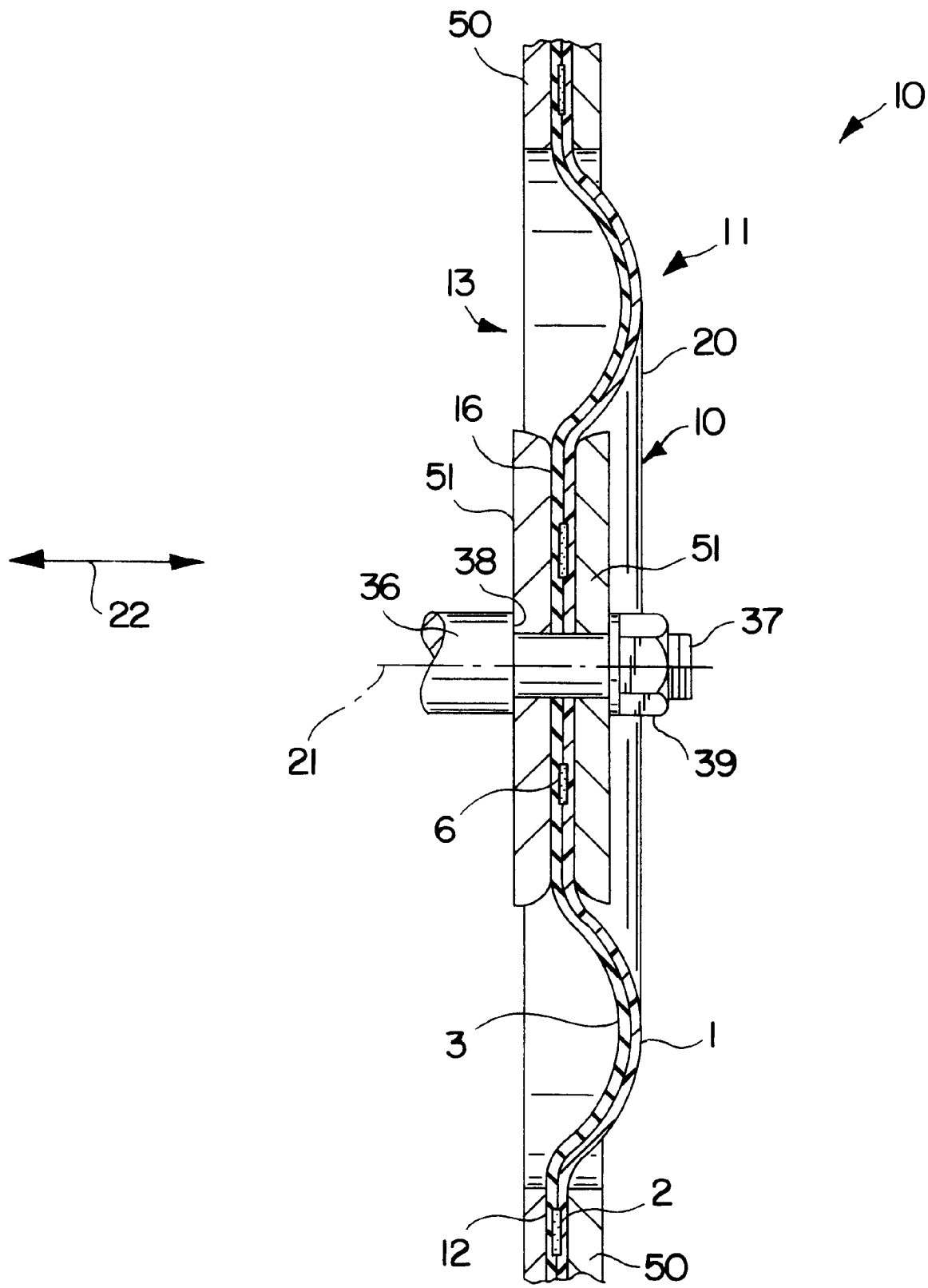
FIG. 2 is a sectional view of the pump diaphragm of FIG. 1 taken along line 2—2 and shown with immediately adjacent parts of a driven diaphragm pump.

Referring now to the drawings, shown in FIGS. 1 and 2 is a pump diaphragm 10 of the first embodiment according to the present invention having a backer layer 3 disposed next to a protective layer 1. During a pumping operation the protective layer 1 faces a liquid receiving side 11 of the pump and acts as a protective barrier for backer layer 3 which faces an air pressure receiving side 13. Typically, backer layer 3 may be made of a reinforced rubber or thermoplastic elastomer and protective layer 1 is made of a synthetic resin polymer such as PTFE.

The diaphragm includes a peripheral portion 12 that is clamped or otherwise attached and held stationary by pump housing 50 during operation of the pump as shown in FIG. 2. A plurality of apertures 14 are provided in peripheral portion 12. Apertures 14 are oriented in a circular array along peripheral portion 12, with each aperture spaced an equal distance from each adjacent aperture. The apertures are adapted to receive a conventional connection member such as a bolt, pin or the like.

Diaphragm 10 also includes a central portion 16 having an opening 18 located at approximately the center of the diaphragm. As shown in FIG. 2 central portion 16 is attached to a pump by clamping between a pair of clamping washers 51 each having a centrally positioned opening to be aligned with diaphragm opening 18. The openings in clamping washers 51 and central portion 16 are adapted to receive an end of a diaphragm rod 36 or other member for moving an annular working portion 20 and the central portion 16 in a reciprocating manner, relative to the fixed peripheral portion 12, along axis 21 in the direction shown by directional arrow 22. One end of diaphragm rod 36 is connected to clamping washers 51 at diaphragm central portion 16 by a shoulder portion 38 and a threaded portion 37 for receiving a nut 39. Diaphragm rod 36 may also be either operatively connected to a mechanical driving means or may be connected to a second diaphragm.

Shown by cross-hatching in FIG. 1 are a plurality of discrete central bonding regions 6 and a plurality of discrete peripheral bonding regions 2 located, respectively, in the central portion 16 and peripheral portion 12 of diaphragm 10. As shown in the sectional view of FIG. 2, central bonding regions 6 and peripheral bonding regions 2 are disposed at the interface between backer layer 3 and protective layer 1 and tack these layers to each other.

Annular working portion 20 joins central portion 16 and peripheral portion 12 and has an arcuate cross section that is directed outwardly away from the peripheral and central portions of pump diaphragm 10. As shown in FIG. 2, protective layer 1 is convex to liquid receiving side 11 and backer layer 3 is concave to air pressure receiving side 13 of a diaphragm pump. The arcuate cross section of annular working portion 20 allows for movement of the diaphragm rod 36 without great resistance from the diaphragm itself during pump operation. As shown in FIG. 2, annular working portion 20 does not contain any bonding regions at the interface between the backer layer 3 and protective layer 1.

Although not to be bound by or otherwise limited to any theory, it is believed that during operation of two-ply diaphragms which are bonded over the entire interface between the backer and protective layers, three-dimensional stresses created by the differences in the modulii of elasticity of the different material layers (e.g., between rubber and TEFLON) cause radial folds in the arcuate working portion during flexure which leads to premature failure of the diaphragm. By selectively limiting the bonding between backer layer 3 and protective layer 1 of diaphragm 10 to regions which are constrained during operation of the diaphragm pump (i.e., the central portion 16 and peripheral portion 12) and eliminating bonding between the backer layer 3 and protective layer 1 in annular working portion 20, it is believed that relative movement between the backer and protective layers will be facilitated in annular working portion 20. In this way, it is believed that the stresses created in the annular working portion 20 between the different materials of backer layer 3 and protective layer 1 will be reduced, which in turn, will increase the useful life of the selectively bonded diaphragm according to the present invention.

Figure 3:
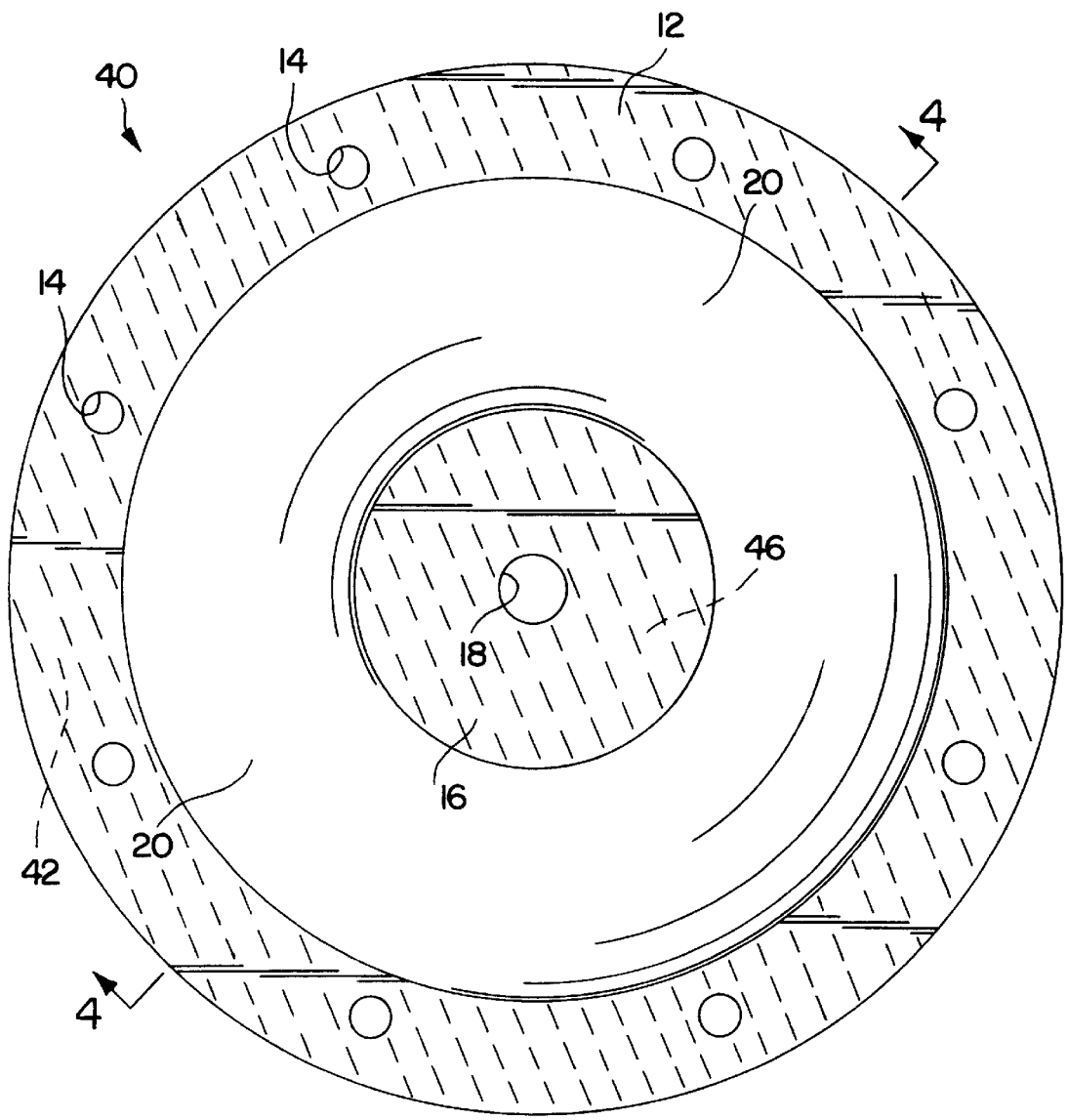
FIG. 3 is a planar view of an alternative embodiment of a pump diaphragm according to the present invention.
Figure 4:
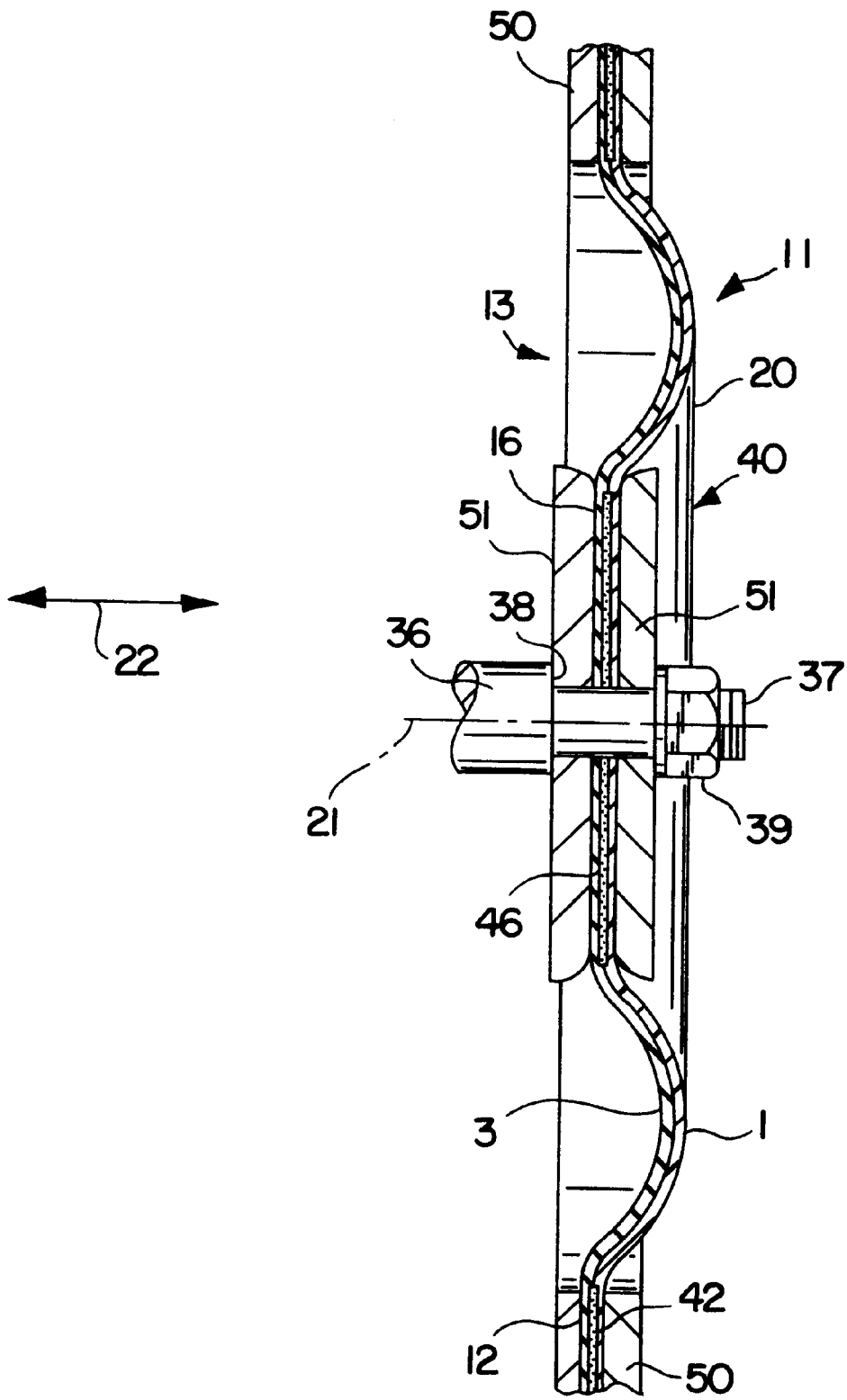
FIG. 4 is a sectional view of the pump diaphragm of FIG. 3 taken along line 4—4 and shown with immediately adjacent parts of a driven diaphragm pump.

Shown in FIGS. 3 and 4 is an alternative embodiment of the bonded diaphragm according to the present invention which is indicated generally as diaphragm 40. Diaphragm 40 is substantially identical to diaphragm 10, with like elements common to both diaphragms shown in FIGS. 3 and 4 being identically numbered to those described above and shown, respectively, in FIGS. 1 and 2. Diaphragm 40 differs from diaphragm 10 in that the amount of bonding area at the interface between backer layer 3 and protective layer 1 is maximized in the regions which are constrained during operation of the diaphragm pump. As shown by cross-hatching in FIG. 3 and by the corresponding sectional view of FIG. 4, a central bonding region 46 and a peripheral bonding region 42 are disposed over substantially the entire interface between backer layer 3 and protective layer 1, respectively, in the central portion 16 and peripheral portion 12 of diaphragm 40 to securely hold these layers together.

Figure 5:
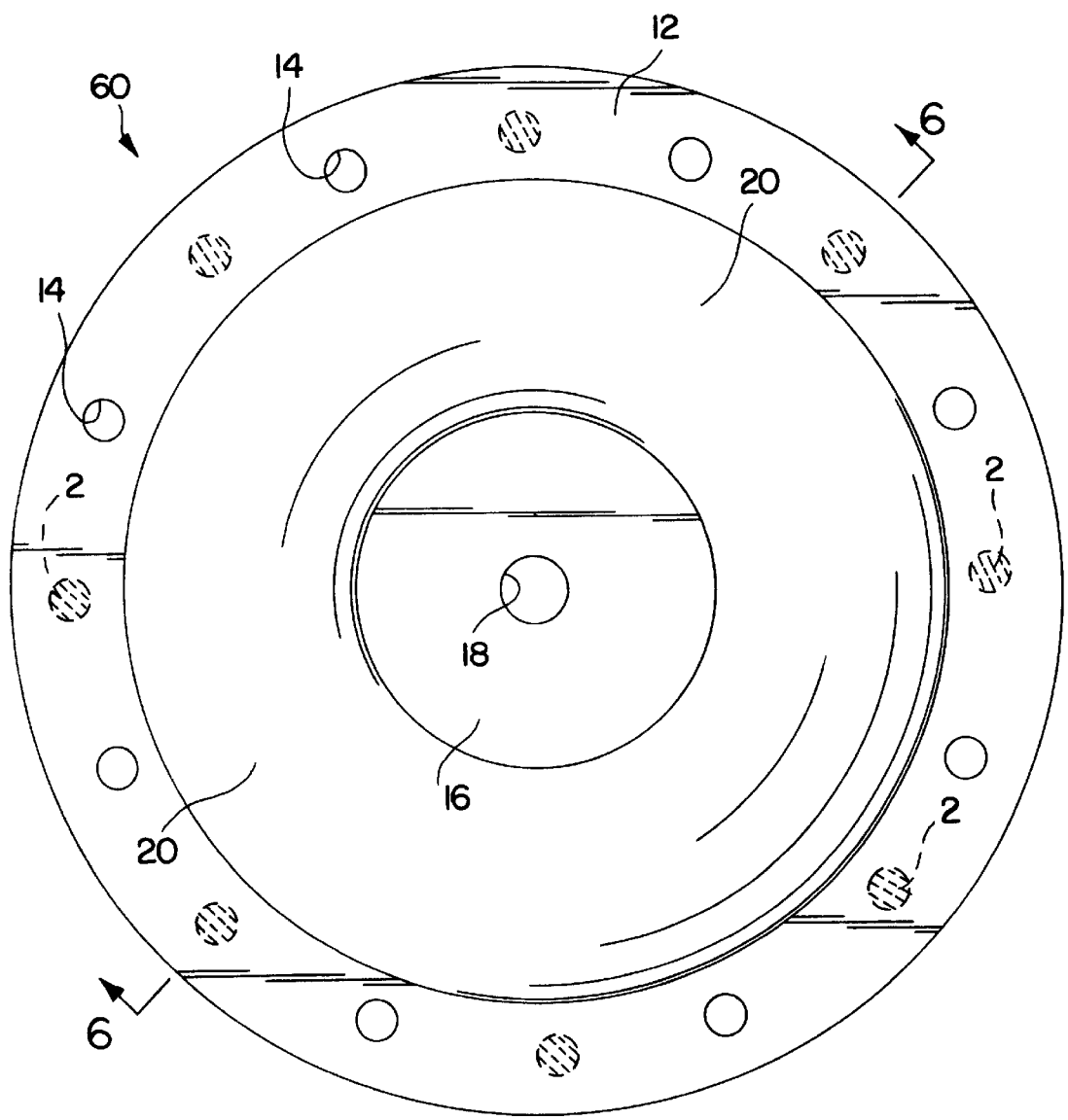
FIG. 5 is a planar view of an alternative embodiment of a pump diaphragm according to the present invention.
Figure 6:
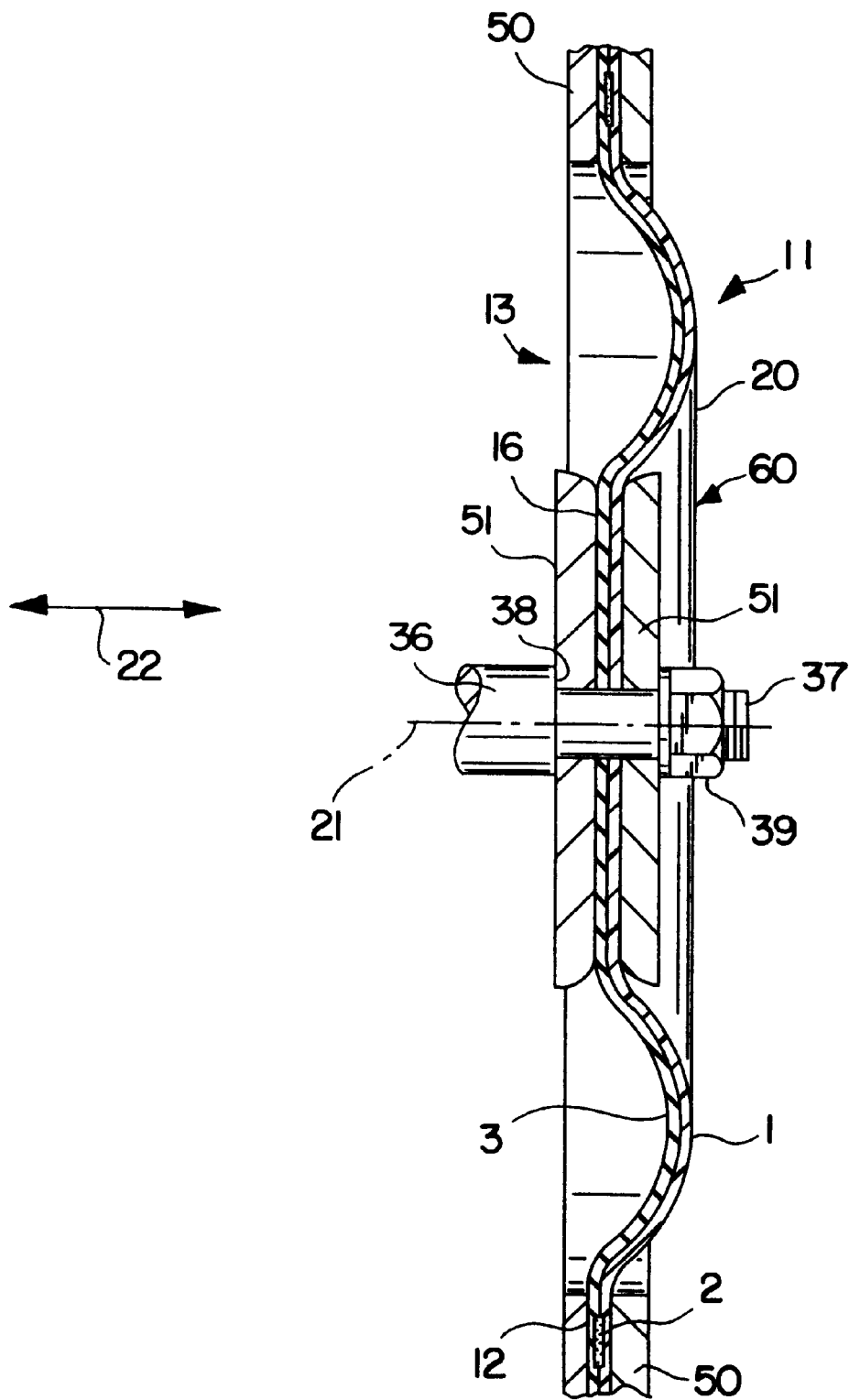
FIG. 6 is a sectional view of the pump diaphragm of FIG. 5 taken along line 6—6 and shown with immediately adjacent parts of a driven diaphragm pump.

Shown in FIGS. 5 and 6 is another alternative embodiment of the bonded diaphragm according to the present invention which is indicated generally as diaphragm 60.

Diaphragm 60 is substantially identical to diaphragm 10, with like elements common to both diaphragms shown in FIGS. 5 and 6 being identically numbered to those described above and shown, respectively, in FIGS. 1 and 2. Diaphragm 60 differs from diaphragm 10 in that the amount of bonding area at the interface between backer layer 3 and protective layer 1 is minimized to include only peripheral bonding regions 2 in peripheral portion 12 which is constrained during operation of the diaphragm pump. The size of the discrete peripheral bonding regions 2 may be minimized to the extent that they still accomplish the purpose of tacking the backer layer 3 to the protective layer 1.

As yet another alternative embodiment, it is understood that central portion 16 may alternatively be bonded in lieu of bonding peripheral bonding region 2 to effect tacking of backer layer 3 to protective layer 1.

Although described above and shown in FIGS. 1–6 with respect to the incorporation of discrete and maximized bonding regions at selective regions of the interface between backer layer 3 and protective layer 1, it is understood that any amount of bonding in between these layers may be employed so long as the bonding remains substantially within the portions of the diaphragm which are not flexed during operation of the diaphragm pump.

With respect to the type of bonding employed, any type of bonding method which is compatible for joining the materials used in backer layer 3 and protective layer 1 may be used. Such methods may include adhesive bonding, chemical bonding, spot welding, thermal bonding and other methods as will be readily recognized by those skilled in the art.

Additionally, although described above primarily with respect to bonded diaphragms having a backer layer made of a reinforced rubber or thermoplastic elastomer and a protective layer of a synthetic resin polymer such as PTFE, the present invention is not to be limited to only these materials combinations. Rather, it is envisioned that other backer layer/protective layer materials combinations may be selected based upon the particular service conditions the pump is to be subjected to, provided the bonding between the layers be applied to regions which are constrained during operation of the diaphragm pump and that bonding between the layers in the annular working portion be substantially eliminated. To the extent that bonding in the annular working portion does occur, it is envisioned that a corresponding decrease in the service life of the diaphragm will be encountered.

Thus, an improved two-ply diaphragm has been devised by the present invention which selectively bonds a backer layer to a protective layer such that the resultant selectively bonded two-ply diaphragm appears to be a single diaphragm to a user while having the ability to move in the working area of the diaphragm during operation.

While embodiments and applications of this invention have been shown and described, it will be apparent to those skilled in the art that many more modifications are possible without departing from the inventive concepts herein described. For example, although diaphragms 10, 40, and 60 are each shown with a peripheral portion 12 having a plurality of apertures 14 to permit passage therethrough of connecting screws, it will be readily recognized that if alternative configurations of pump housing 50 are used to join the pump halves (e.g., by a mating bead and channel arrangement on the circumference of the inner faces of the pump housing), the peripheral portion and the peripheral bonding region may be configured accordingly to accommodate. All that is required is that the bonding regions between the backer and protective layers of the diaphragm be located between the regions to be constrained by the pump housing halves during operation of the pump.

It is understood, therefore, that the invention is capable of modification, and therefore is not to be limited to the precise details set forth. Rather, various modifications may be made in the details within the scope and range of equivalents of the claims and without departing from the spirit of the invention.

Having described the invention, what is claimed is:

1. A selectively bonded two-ply diaphragm for a diaphragm pump, the diaphragm having adjacent first and second layers having an interface therebetween, comprising:
   at least one attachment portion adapted for attachment to a pump in which said first and second layers are at least partially bonded at said interface; and
   an annular working portion free of said partial bonding in which said first and second layers are free to move relative to one another at said interface.

2. The diaphragm as claimed in claim 1 wherein said at least one attachment portion comprises
   a central portion adapted for attachment to a diaphragm rod of a pump;
   and a peripheral portion surrounding said central portion, said peripheral portion adapted for stationary attachment to a pump housing; and
   said working portion joins said peripheral portion and said central portion.

3. The diaphragm as claimed in claim 2, wherein said first and second layers are at least partially bonded at said interface in a region selected from the group consisting of said peripheral portion, said central portion, and combinations thereof.

4. The diaphragm as claimed in claim 3, wherein said first and second layers are at least partially bonded by discrete bonding regions at said interface in said peripheral portion.

5. The diaphragm as claimed in claim 2, wherein said first and second layers are substantially bonded at said interface in a region selected from the group consisting of said peripheral portion, said central portion, and combinations thereof.

6. The diaphragm as claimed in claim 5, wherein said first and second layers are substantially bonded at said interface in said peripheral portion and in said central portion.

7. The diaphragm as claimed in claim 1, wherein said first layer is a backer layer and said second layer is a protective layer.

8. The diaphragm as claimed in claim 7, wherein said backer layer comprises a material selected from the group consisting of a reinforced rubber and a thermoplastic elastomer; and
   said protective layer comprises a synthetic resin polymer.

9. The diaphragm as claimed in claim 8, wherein said synthetic resin polymer is polytetrafluoroethylene (PTFE).

10. The diaphragm as claimed by claim 7, produced by the process of bonding said backer layer to said protective layer by a method selected from the group consisting of adhesive bonding, chemical bonding, spot welding, and thermal bonding.

11. The diaphragm pump as claimed in claim 7, wherein said protective layer is convex for a liquid receiving side of a pump and backer layer is concave for an air pressure receiving side of a diaphragm pump.

12. A selectively bonded two-ply diaphragm for a diaphragm pump, the diaphragm having adjacent first and second layers having an interface therebetween, comprising:

a central portion adapted for attachment to a diaphragm rod of a pump;

a peripheral portion surrounding said central portion, said peripheral portion adapted for stationary attachment to a pump housing and within which said first and second layers are at least partially bonded by discrete bonding regions; and an annular working portion free of said partial bonding joining said peripheral portion and said central portion in which said first and second layers are free to move relative to one another at said interface.

13. The diaphragm pump as claimed in claim 12, wherein said first and second layers are at least partially bonded by discrete bonding regions at said interface said central portion.

14. A selectively bonded two-ply diaphragm for a diaphragm pump, the diaphragm having adjacent first and second layers having an interface therebetween, comprising:

a central portion adapted for attachment to a diaphragm rod of a pump;

a peripheral portion surrounding said central portion, said peripheral portion adapted for stationary attachment to a pump housing, said first and second layers being substantially bonded at said interface in said peripheral portion and in said central portion; and an annular working portion free of said partial bonding joining said peripheral portion and said central portion in which said first and second layers are free to move relative to one another at said interface.

* * * * *

UNITED STATES PATENT AND TRADEMARK OFFICE
CERTIFICATE OF CORRECTION

PATENT NO. : 6,145,430
DATED : November 14, 2000
INVENTOR(S) : Stephen D. Able, Nicholas Kozumplik, Jr.

It is certified that error appears in the above-identified patent and that said Letters Patent is hereby corrected as shown below:

Claim 14,
Line 11, delete "partial" and insert -- substantial --.

Signed and Sealed this

Twenty-third Day of October, 2001

Attest:

*Attesting Officer*

NICHOLAS P. GODICI
*Acting Director of the United States Patent and Trademark Office*